(12) United States Patent
Grether et al.

(10) Patent No.: US 8,608,125 B2
(45) Date of Patent: Dec. 17, 2013

(54) SEAT TRACK ASSEMBLY

(75) Inventors: Martin Grether, Mill Creek, WA (US);
Paul R. Fortado, Everett, WA (US);
Viet Q. Phan, Seattle, WA (US); Gina Pischke, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 11 days.

(21) Appl. No.: 13/471,055

(22) Filed: May 14, 2012

(65) Prior Publication Data

US 2012/0222284 A1    Sep. 6, 2012

Related U.S. Application Data

(62) Division of application No. 11/643,111, filed on Dec. 21, 2006, now Pat. No. 8,177,184.

(51) Int. Cl.
*A47B 97/00*    (2006.01)

(52) U.S. Cl.
USPC ....... 248/503.1; 29/700; 52/223.8; 244/122 R

(58) Field of Classification Search
USPC ................ 248/503.1, 429, 424; 14/2, 3, 74.5;
244/122 R, 118.5, 118.6; 297/311,
297/344.1; 410/104, 105; 384/47.55;
52/223.8, 837–839, 846, 636, 650.1;
29/700, DIG. 26, DIG. 38, DIG. 47
See application file for complete search history.

(56) References Cited

U.S. PATENT DOCUMENTS

| | | | |
|---|---|---|---|
| 496,466 A | 5/1893 | White | |
| 995,059 A | 6/1911 | Danielson | |
| 1,005,327 A | 10/1911 | Schleicher | |
| 1,725,439 A | 8/1929 | Cams | |
| 1,740,053 A | 12/1929 | Wehr | |
| 1,843,318 A | 2/1932 | Frease | |
| 3,089,564 A | 5/1963 | Smittle | |
| 3,141,531 A | 7/1964 | Montgomery | |
| 4,630,546 A | 12/1986 | Wiger et al. | |
| 5,178,346 A | 1/1993 | Beroth | |
| 5,291,704 A | 3/1994 | Savorani | |
| 5,412,921 A | 5/1995 | Tripp | |
| 6,408,591 B1 | 6/2002 | Yamashita et al. | |
| 6,554,225 B1 | 4/2003 | Anast et al. | |
| 7,051,978 B2 | 5/2006 | Reed et al. | |
| 7,093,797 B2 | 8/2006 | Grether et al. | |
| 7,195,201 B2 | 3/2007 | Grether et al. | |
| 7,506,855 B2 | 3/2009 | Frantz et al. | |
| 7,810,757 B2 | 10/2010 | Kirkwood et al. | |
| 2005/0211833 A1 | 9/2005 | Frantz et al. | |
| 2005/0211836 A1 | 9/2005 | Frantz et al. | |
| 2005/0258676 A1 | 11/2005 | Mitchell et al. | |

FOREIGN PATENT DOCUMENTS

| | | |
|---|---|---|
| EP | 1564141 A1 | 8/2005 |
| FR | 2864940 A1 | 7/2005 |
| GB | 2400242 A | 10/2004 |

OTHER PUBLICATIONS

International Search Report and Written Opinion for PCT/US2007/088467 dated May 7, 2008.

*Primary Examiner* — Korie H Chan

(74) *Attorney, Agent, or Firm* — Parsons Behle & Latimer

(57) ABSTRACT

A seat track assembly is disclosed. An illustrative embodiment of the seat track assembly includes a seat track having an elongated track plate and a pair of generally elongated, parallel, spaced-apart track flanges extending from the track plate. Each of the track flanges is variable in depth. A method of fabricating a seat track assembly is also disclosed.

14 Claims, 1 Drawing Sheet

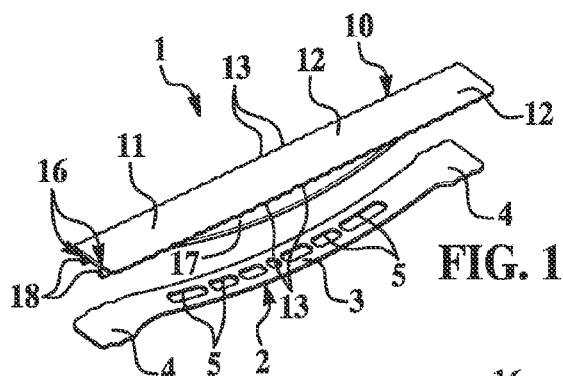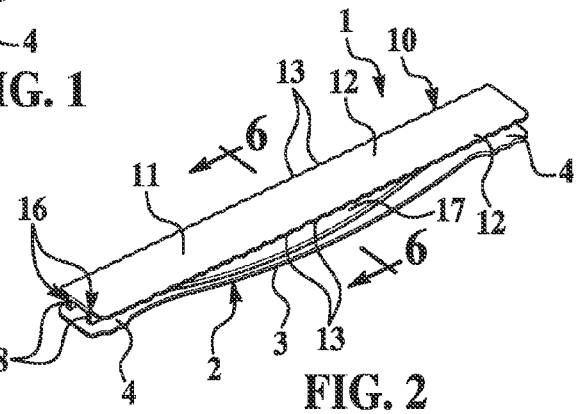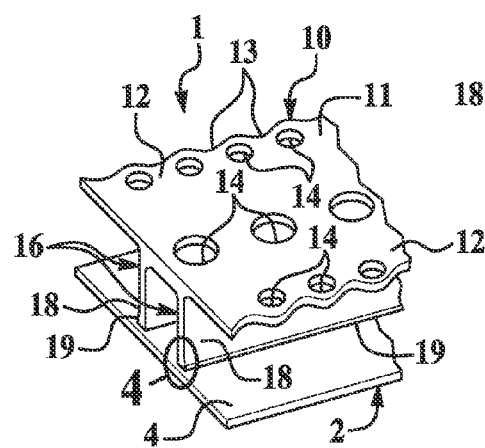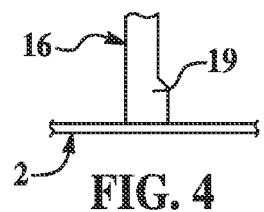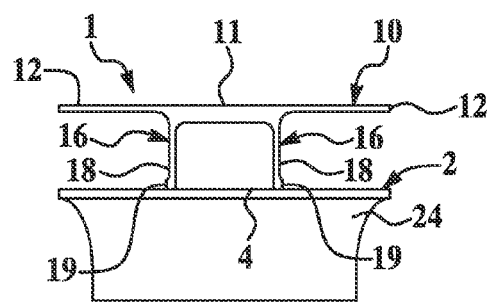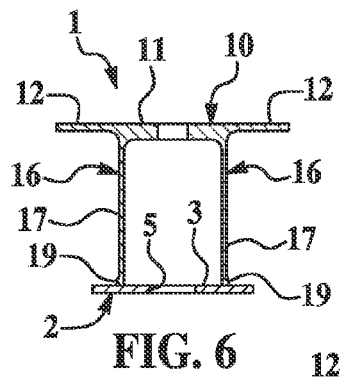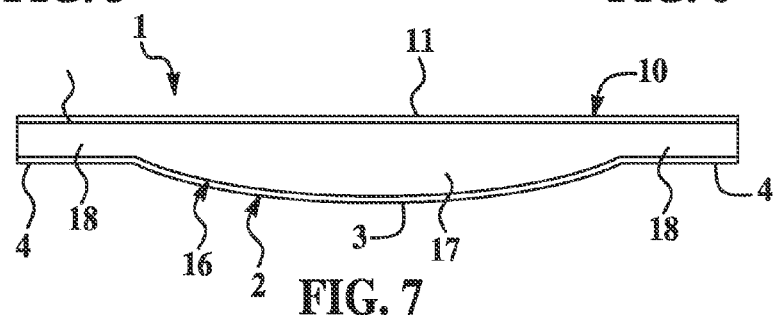

SEAT TRACK ASSEMBLY

This application is a divisional of U.S. patent application Ser. No. 11/643,111, filed Dec. 21, 2006 now U.S. Pat. No. 8,177,184, entitled "Seat Track Assembly," the disclosure of which is hereby incorporated by reference in its entirety.

FIELD

The present invention relates to seat track assemblies for passenger aircraft. More particularly, the present invention relates to a seat track assembly which is lightweight and has an optimum load bearing configuration.

BACKGROUND

Seat tracks are used in passenger aircraft to anchor passenger seats to the airframe of the aircraft. Conventional seat tracks typically have a "hat" design (a pair of outwardly-extending top flanges and a pair of outwardly-extending middle flanges which together form a top cord and a pair of outwardly-extending bottom flanges which form a bottom cord). The middle flanges are used to attach the track to the airframe.

One of the limitations of the conventional aircraft seat tracks is that the top, middle and bottom flanges are thick to overcome load instability. This renders excessive weight of about 400 lbs. to the tracks, resulting in loss of about $120,000 in revenue for each aircraft per year. Moreover, seat tracks are typically extruded. Extrusion is optimal for objects which have a constant or uniform cross-sectional geometry; because an optimized seat track would be thicker at the middle than at the ends of the track since loads are greater at the middle, fabrication of an optimized extruded track would require extensive machining of a large block of metal such as titanium.

SUMMARY

The present invention is generally directed to a seat track assembly. An illustrative embodiment of the seat track assembly includes a seat track having an elongated track plate and a pair of generally elongated, parallel, spaced-apart track flanges extending from the track plate. Each of the track flanges is variable in depth. A method of fabricating a seat track assembly is also disclosed.

The present invention is further generally directed to a method of fabricating a seat track assembly. An illustrative embodiment of the method includes providing a seat track having an elongated track plate and a pair of generally elongated, parallel, spaced-apart track flanges extending from the track plate, wherein each of the track flanges is variable in depth; and welding a base flange to the track flanges of the seat track.

BRIEF DESCRIPTION OF THE DRAWINGS

The invention will now be described, by way of example, with reference to the accompanying drawings, in which:

FIG. 1 is an exploded perspective view of an illustrative embodiment of a seat track assembly.

FIG. 2 is a perspective view of an illustrative embodiment of the seat track assembly.

FIG. 3 is a perspective view, partially in section, of an end portion of an illustrative embodiment of the seat track assembly.

FIG. 4 is a sectional view, taken along section line 4 in FIG. 3.

FIG. 5 is an end view of an illustrative embodiment of the seat track assembly, attached to an airframe.

FIG. 6 is a cross-sectional view, taken along section lines 6-6 in FIG. 2, of a middle portion of an illustrative embodiment of the seat track assembly.

FIG. 7 is a side view of an illustrative embodiment of the seat track assembly.

DETAILED DESCRIPTION

Referring to the drawings, an illustrative embodiment of the seat track assembly is generally indicated by reference numeral 1. The seat track assembly 1 includes a generally elongated base flange 2 which is typically titanium. In some embodiments, the base flange 2 is a constant gauge base flange 2; in other embodiments, the base flange 2 is a variable gauge base flange 2. The base flange 2 includes a generally elongated, curved center segment 3. A generally straight end segment 4 terminates each end of the center segment 3. In some embodiments, multiple lightening apertures 5 are provided in the center segment 3 in adjacent, spaced-apart relationship with respect to each other. Each lightening aperture 5 typically has a generally elongated, rectangular shape.

A Pi-Box type seat track 10 is provided on the base flange 2. The seat track 10 is typically titanium and includes a generally elongated, rectangular track plate 11. In some embodiments, the seat track 10 is extruded; in other embodiments, the seat track 10 is machined from a block of metal such as titanium. The track plate 11 has a pair of opposite edge portions 12. As shown in FIGS. 1-3, in some embodiments, multiple plate notches 13 are provided in each edge portion 12 of the track plate 11. As shown in FIG. 3, in some embodiments, multiple plate apertures 14 are provided in the track plate 11 to facilitate attachment of a passenger seat (not shown) to the seat track assembly 1.

A pair of elongated track flanges 16 extends from the track plate 11 of the seat track 10 in generally parallel, spaced-apart relationship with respect to each other. Each of the track flanges 16 is welded and/or otherwise attached to the base flange 2. As shown in FIGS. 5-7, each track flange 16 includes a center flange segment 17 which typically has a generally curved shape in side view, as particularly shown in FIG. 7. A generally straight end flange segment 18 extends from each end of the center flange segment 17. As further shown in FIGS. 5-7, the center flange segment 17 has a depth which is greater than that of each end flange segment 18; therefore, the contour or shape of the center flange segment 17 and end flange segment 18 of each track flange 16 is generally complementary in shape to the center segment 3 and each end segment 4, respectively, of the base flange 2. In some embodiments, each track flange 16 has a constant thickness; in other embodiments, each track flange 16 has a variable thickness. As shown in FIGS. 4-6, in some embodiments of the seat track assembly 1, a flange lip 19 is provided in the extending or distal edge of each track flange 16 which is attached to the base flange 2 for reinforcement purposes.

As shown in FIG. 5, in typical use of the seat track assembly 1, the base flange 2 is bolted and/or otherwise attached to a portion of an airframe 24 which forms the floor of a passenger aircraft (not shown). Passenger seats (not shown) are bolted (by the extension of bolts through the plate apertures 14) and/or otherwise attached to the edge portions 12 on the track plate 11 of the seat track 10 using techniques which are well-known to those skilled in the art. During weight loading of the passenger seats, the center flange segment 17 bears a greater load than the end flange segments 18 of each track flange 16. Accordingly, the greater depth or thickness of the center flange segment 17 relative to that of the end flange segments 18 of each track flange 16 enable the seat track assembly 1 to effectively withstand the weight dynamics which are associated with loading and unloading of the passenger seats. This enhances stability of the seat track 10 at high weight loads. Due to the greater depth or thickness of the center flange segment 17 relative to that of each end flange segment 18 of each track flange 16, each seat track assembly 1 is about 400 lbs. lighter than the conventional seat track assembly, in which the thickness of each track flange 16 is substantially uniform throughout the length of each.

Although this invention has been described with respect to certain exemplary embodiments, it is to be understood that the specific embodiments are for purposes of illustration and not limitation, as other variations will occur to those of ordinary skill in the art.

What is claimed is:

1. A method of fabricating a seat track assembly, comprising:
    providing a seat track having an elongated track plate and a pair of generally elongated, parallel, spaced-apart track flanges extending from the track plate, each of the track flanges being variable in depth and including a generally elongated, curved center flange segment and a pair of end flange segments extending from the center flange segment, the center flange segment having a depth greater than a depth of each of the pair of end flange segments;
    welding a base flange to the track flanges of the seat track, the base flange having a center segment; and
    forming a plurality of spaced-apart lightening apertures in the center segment of the base flange.

2. The method of claim 1 wherein providing the seat track comprises extruding the seat track.

3. The method of claim 1 wherein providing the seat track comprises machining the seat track.

4. The method of claim 1, wherein providing the seat track comprises providing a seat track having track flanges that are variable in thickness.

5. The method of claim 1, wherein welding the base flange to the track flanges comprises welding a base flange having a generally elongated, curved center segment and a pair of generally straight end segments extending from the center segment.

6. A method for reducing weight of an aircraft seat track assembly, comprising:
    providing a seat track having
        an elongated track plate;
        a pair of generally elongated, parallel, spaced-apart track flanges extending from the track plate, each of the track flanges having a curved center flange segment with a maximum depth therein;
    welding a curved base flange to the track flanges of the seat track, the base flange having a generally elongated center segment having a curvature that substantially matches a curvature of the curved center flange segment, and a pair of generally straight end segments extending from the center segment; and
    forming a plurality of spaced-apart lightening apertures in the center segment of the base flange.

7. The method of claim 6, further comprising attaching the base flange to a floor of an aircraft.

8. The method of claim 7, further comprising attaching a passenger seat to the track plate.

9. The method of claim 6, wherein providing the seat track comprises extruding the seat track.

10. The method of claim 6, wherein providing the seat track comprises machining the seat track.

11. The method of claim 6, wherein providing the seat track comprises providing a seat track having track flanges that are variable in thickness.

12. A method for attaching passenger seats in a passenger aircraft, comprising:
    fabricating a seat track assembly comprising
        a seat track having an elongated track plate and a pair of generally elongated, parallel, spaced-apart track flanges extending from the track plate, each of the track flanges being variable in depth and having a curved center flange segment with a maximum depth therein; and
        a base flange, affixed to the track flanges of the seat track, having a generally elongated center segment having a curvature that substantially matches a curvature of the center flange segment, and a plurality of spaced-apart lightening apertures in the center segment;
    attaching the base flange to an aircraft floor; and
    attaching passenger seats to the track plate.

13. The method of claim 12, wherein attaching the passenger seats comprises bolting the passenger seats through apertures in the base flange.

14. The method of claim 12, wherein attaching the base flange to the aircraft floor comprises bolting the base flange to an airframe that forms the floor of the aircraft.

\* \* \* \* \*